United States Patent
Tulder

[11] Patent Number: 6,128,043
[45] Date of Patent: *Oct. 3, 2000

[54] MULTI-STANDARD SIGNAL RECEPTION

[75] Inventor: Henricus B.J.M. Tulder, Mitterretzbach, Austria

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/792,320

[22] Filed: Jan. 31, 1997

[30] Foreign Application Priority Data

Feb. 5, 1996 [EP] European Pat. Off. ............ 96200249

[51] Int. Cl.$^7$ ...................................................... H04N 5/44
[52] U.S. Cl. ......................... 348/555; 348/553; 348/558; 348/723; 348/726
[58] Field of Search ................................. 348/555, 558, 348/725, 726, 737, 553, 723, 727, 728, 731, 735; H04N 5/44

[56] References Cited

U.S. PATENT DOCUMENTS

| | | | |
|---|---|---|---|
| 4,309,719 | 1/1982 | Hinn | 358/16 |
| 5,161,004 | 11/1992 | Egger . | |
| 5,355,162 | 10/1994 | Yazolino | 348/555 |
| 5,392,456 | 2/1995 | Mitomo | 455/38.3 |
| 5,570,136 | 10/1996 | Kim | 348/725 |
| 5,657,090 | 8/1997 | Friesen | 348/558 |
| 5,663,768 | 9/1997 | Yang | 348/557 |
| 5,673,088 | 9/1997 | Nah | 348/555 |
| 5,737,035 | 4/1998 | Rotzoll | 348/725 |

FOREIGN PATENT DOCUMENTS

| | | |
|---|---|---|
| 19508257 | 10/1995 | Germany . |
| 2203306 | 10/1988 | United Kingdom . |

*Primary Examiner*—Mark R. Powell
*Assistant Examiner*—Wesner Sajous
*Attorney, Agent, or Firm*—Steven R. Biren

[57] ABSTRACT

A multi-standard receiver is which is particularly suited for reception of B/G-PAL and D/K-PAL TV signals. In the receiver, a tuner (TUN) selects a desired TV signal which is passed to a multi-standard demodulator (DEM) via an intermediate-frequency filter circuit (IFF). To obtain good performance, particularly in view of EN 55020 requirements, at moderate costs, the intermediate-frequency filter circuit (IFF) includes a main filter (FIL1) and an auxiliary filter (FIL2). The main filter (FIL1) may have a relatively narrow band, for example, just capable of passing a full B/G-PAL TV IF signal to the demodulator circuit. For D/K-PAL reception, the auxiliary filter (FIL2) is effectively switched (SW) in parallel with the main filter (FIL1). The auxiliary filter (FIL2) transfers the D/K-PAL sound carrier to the demodulator circuit (DEM), which transfer is not possible via the relatively narrow-band main filter (FIL1).

7 Claims, 1 Drawing Sheet

MULTI-STANDARD SIGNAL RECEPTION

BACKGROUND OF THE INVENTION

1. Field of the Invention

The invention relates to a method and apparatus for receiving signals, in particular television (TV) signals, which are transmitted in accordance with different transmission standards. For example, in some European regions, TV transmissions of both the B/G-PAL type and of the D/K-PAL type may be received with a suitable multi-standard TV receiver.

2. Description of the Related Art

Multi-standard TV receivers suitable for reception of both B/G-PAL and D/K-PAL TV signals are known. Like other conventional TV receivers, these multi-standard receivers comprise a tuner, an intermediate-frequency (IF) filter circuit and a demodulator circuit. The tuner selects a desired TV signal and frequency-converts the desired TV signal to obtain a TV IF signal. The IF filter circuit passes the TV IF signal, which is provided by the tuner, to the demodulator circuit. In response to the filtered TV IF signal, the demodulator circuit provides a baseband video signal and a baseband audio signal. The demodulator circuit can operate in a B/G-mode and a D/K-mode for demodulating B/G-PAL TV signals and D/K-PAL TV signals, respectively.

Multi-standard TV receivers, like ordinary TV receivers, have to satisfy so-called EN55020 requirements in many European countries. One of the EN55020 requirements stipulates that no noticeable interference should occur in the baseband video signal, when an adjacent channel TV signal of a certain level is present. This is referred to as the interference immunity requirement.

SUMMARY OF THE INVENTION

It is an object of the invention to provide a multi-standard reception method and apparatus of relatively low cost and yet a relatively good performance, so that it meets, for example, the EN 55020 requirements.

Such a receiver is characterized in that the intermediate frequency-filter circuit comprises a main filter, an auxiliary filter, and a switching arrangement for selectively switching the auxiliary filter in parallel with the main filter as a function of the transmission standard of the signal to be received. Another aspect of the invention provides a reception method comprising the steps of selecting a desired signal to obtain an intermediate-frequency signal; intermediate-frequency filtering the intermediate-frequency signal to obtain a filtered intermediate-frequency signal; and deriving at least one baseband signal from said filtered intermediate-frequency signal; characterized in that the intermediate-frequency filtering steps comprise the further steps of subjecting said intermediate-frequency signal to a primary filtering operation to obtain a main filtered signal; subjecting said intermediate-frequency signal to an auxiliary filtering operation to obtain an auxiliary filtered signal in dependence upon a transmission standard of said desired signal; and obtaining said filtered intermediate-frequency signal from said main filtered signal and any auxiliary filtered signal.

The invention may be used, for example, in a multi-standard TV receiver capable of receiving B/G-PAL TV signals as well as D/K-PAL TV signals. In the case of B/G-PAL, the TV IF signal is transferred to the demodulator circuit DEM via the main filter only. In the case of D/K-PAL, the auxiliary filter is switched in parallel with the main filter and also contributes to the signal transfer. The main filter may have a relatively narrow band, just capable of passing a full B/G-PAL TV IF signal to the demodulator circuit. In such a way, EN 55020 interference immunity requirements for B/G-PAL reception can be met. The auxiliary filter can transfer the D/K-PAL sound carrier to the demodulator circuit, which transfer is not possible via the relatively narrow-band main filter. The above example is a more cost-effective solution than one in which both a dedicated B/G-PAL filter and a dedicated D/K-PAL filter are used.

The additional features, wherein the main filter and the auxiliary filter have symmetrical inputs and/or symmetrical outputs which are commonly coupled in opposite phase, contribute to the suppression of any unwanted signal in the frequency range in which the responses of the main and auxiliary filters overlap.

The additional features, wherein the main filter and the auxiliary filter have symmetrical inputs, one of the symmetrical inputs of each filter being coupled to signal ground, contribute to a cost-effective implementation of the switching arrangement.

The additional features, wherein the switching arrangement attenuates the intermediate-frequency signal provided by the tuner, provide a good balance between the signal levels at the outputs of the main filter and the auxiliary filter.

The additional features, wherein the switching arrangement comprises a series resistor for attenuating the intermediate-frequency signal, cost-effectively provide the advantage already mentioned above.

The additional features, wherein the switching arrangement comprises a switching transistor which is coupled between an input of the auxiliary filter and signal ground, and a switching diode which is coupled in series with the input of the auxiliary filter, counter unwanted signal transfer via the auxiliary filter.

BRIEF DESCRIPTION OF THE DRAWING

The invention will hereinafter be described in greater detail with reference to examples shown in the drawing. Furthermore, the additional features can also be recognized in the examples.

In the drawing.

DESCRIPTION OF THE PREFERRED EMBODIMENTS

The invention will now be described, by way of example, with reference to the FIG. 1 multi-standard TV receiver which is capable of receiving both B/G-PAL and B/K-PAL TV signals. The FIG. 1 receiver derives baseband audio and video signals, SND and VID, respectively, from a desired TV input signal TVI. The FIG. 1 receiver comprises the following main circuits: a tuner TUN, an IF filter circuit IFF, a demodulator circuit DEM, and a control circuit CON.

The tuner TUN selects the desired TV signal and frequency-converts it to obtain a TV IF signal TIF. The IF filter circuit IFF passes the TV IF signal TIF to the demodulator circuit DEM. In response to the filtered TV IF signal, the demodulator circuit DEM provides the baseband audio and video signals SND and VID, respectively. The control circuit CON sets the characteristics of the relevant circuits TUN, IFF and DEM in accordance with the standard of the desired TV signal.

Like the desired TV signal at the tuner input, the TV IF signal TIF comprises a picture carrier and a sound carrier. The picture carrier frequency is approximately 38.9 MHz for both B/G-PAL and D/K-PAL signals. The sound carrier frequency is approximately 33.4 MHz in the case of PAL B/G, and approximately 32.4 MHz in the case of PAL D/K. Accordingly, the demodulator circuit DEM may operate in two modes: a B/G-mode and a D/K-mode for demodulating B/G-PAL TV signals and D/K-PAL TV signals, respectively. In the B/G-mode, the demodulator circuit DEM is responsive to a sound carrier which has a frequency of approximately 33.4 MHz. In the D/K-mode, the demodulator circuit DEM is responsive to a sound carrier which has a frequency of approximately 33.4 MHz. The demodulator circuit DEM may be arranged, for example, in accordance with the intercarrier system.

Figure 2:
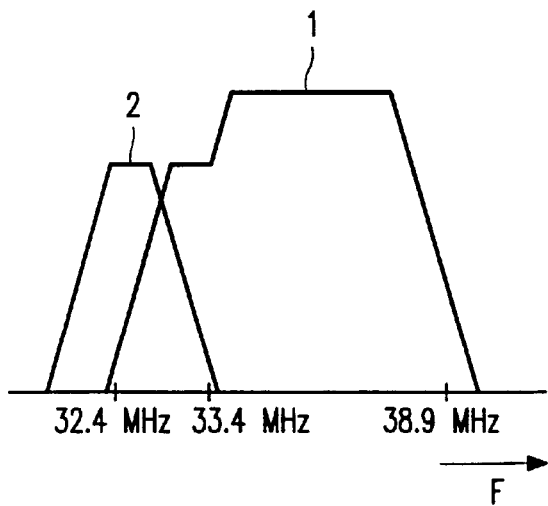
FIG. 2 shows frequency responses of filters in the FIG. 1 multi-standard television receiver.

The IF filter circuit IFF comprises a main IF filter FIL1 and an auxiliary filter FIL2. FIG. 2 shows examples of frequency responses of the main filter FIL1 and the auxiliary filter FIL2 in a single graph. The frequency response of the main filter is denoted by the reference numeral 1 in FIG. 2. The frequency response 1 includes a Nyquist slope which is centered at the picture carrier frequency of 38.9 MHz. Furthermore, there are two frequency ranges in which the frequency response 1 is substantially flat. One of these two ranges approximately extends from 33.9 MHz to 38.4 MHz and covers luminance components in the TV IF signal. The other one of these two ranges is smaller and centered at the B/G-PAL sound carrier frequency of 33.4 MHz. The level of the frequency response 1 is lower in the latter range than in the former range.

In FIG. 2, the frequency response of the auxiliary filter FIL2 is denoted by the reference numeral 2. The frequency response 2 has a band-pass characteristic which is centered at the D/K-PAL sound carrier frequency of 32.4 MHz. The band-pass characteristic has a relatively small width, but is sufficient to pass the full D/K-PAL sound carrier.

Both filters FIL1 and FIL2 may be implemented, for example, as SAW filters having symmetrical inputs and outputs. In FIG. 1, the symmetrical outputs of the filters FIL1, FIL2 are mutually coupled, and coupled to the demodulator circuit DEM which has a symmetrical input. For both IF filters FIL1, FIL2, it holds that one symmetrical input is coupled to signal ground, whereas the other symmetrical input is coupled to receive a common-mode input signal. In accordance therewith, one symmetrical output of the tuner TUN is coupled to signal ground, whereas the other symmetrical output provides the common-mode TV IF signal TIF for supply to the IF filter circuit IFF. An inductance LC is arranged between the symmetrical outputs of tuner TUN for the purpose of impedance matching.

A switching arrangement SW is coupled between the output of the tuner TUN and an input of auxiliary filter FIL2. The switching arrangement SW has two modes: a B/G-mode and a D/K-mode. In the B/G-mode, the switching arrangement SW passes the TV IF signal TIF, present at the output of the tuner TUN, to the input of the auxiliary filter FIL2. In the D/K-mode, the switching arrangement SW effectively blocks such a signal transfer. A control signal CS provided by the control circuit CON determines whether the switching arrangement SW is in the B/G-mode or in the D/K-mode.

The switching arrangement SW comprises a switching transistor TS, a switching diode DS and a series resistor RS. The switching transistor TS receives the control signal CS at its base. The control signal CS has a high level in the case of B/G-PAL and a low level in the case of D/K-PAL.

The high level of the control signal CS causes the switching transistor TS to effectively short-circuit the input of the auxiliary filter FIL2 to signal ground. Furthermore, the high level of the control signal CS prevents current from flowing through the switching diode DS which, consequently, insulates the input of the auxiliary filter FIL2 from the output of the tuner TUN.

In contrast, the low level of the control signal CS causes the switching diode DS to conduct and the switching transistor TS to turn off, such that the output of the tuner TUN is electrically coupled to the input of the auxiliary filter FIL2. In that case, the TV IF signal TIF is transferred to the input of the auxiliary filter FIL2 with some attenuation. The attenuation depends on the value of the series resistor RS.

Figure 1:
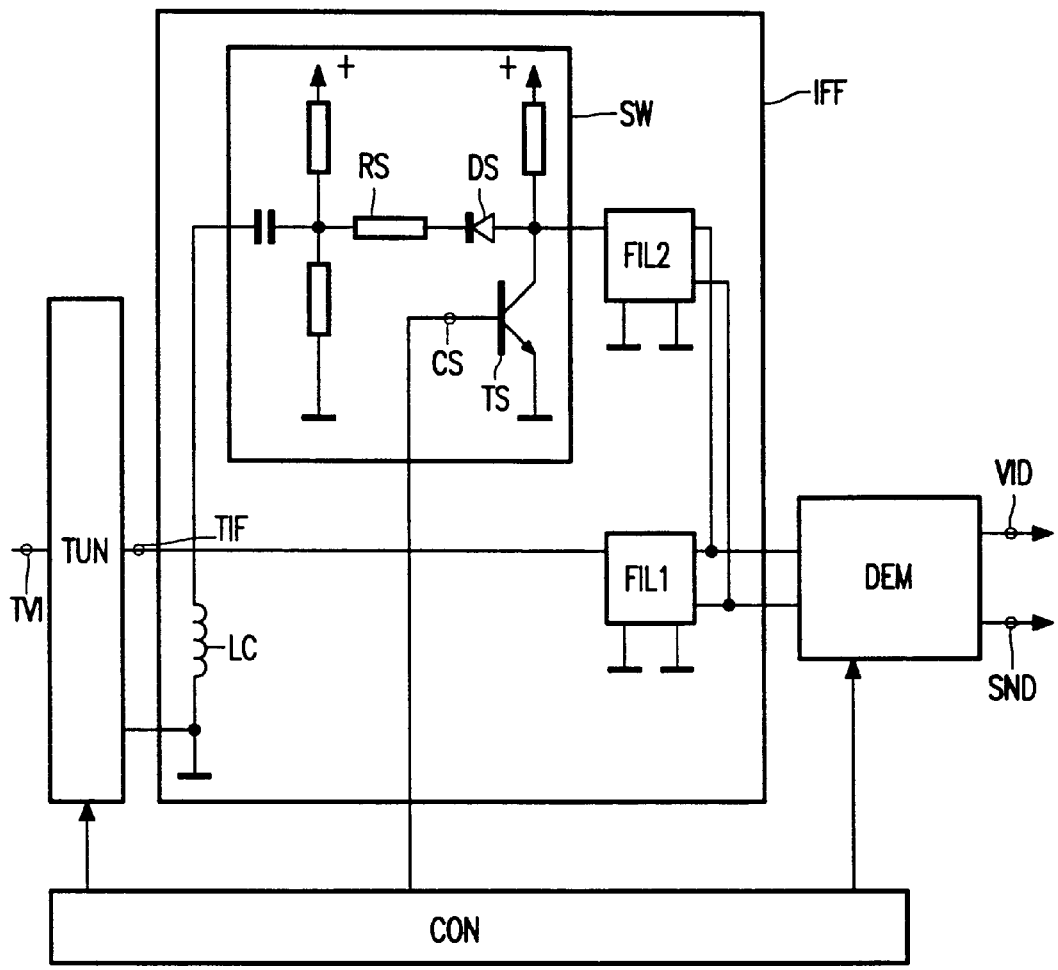
FIG. 1 shows, in a block diagram form, an example of a multi-standard TV receiver in accordance with the invention.

Elements in FIG. 1 which have no reference signs, are used for suitably coupling AC and/or DC signals, as these skilled in the art will immediately recognize. Consequently, those elements need not be further described in this document.

Evidently, the invention may be implemented differently from the examples described above. The invention may be implemented by means of hardware comprising several distinct elements, and by means of a suitably programmed computer. To indicate that the scope of the invention claimed is well beyond the examples described above, some final remarks are made.

It should also be noted that the invention is not limited to multi-standard reception of B/G-PAL and D/K-PAL TV signals.

It should be noted that the invention is not limited to television receivers equipped with a picture display device. For example, the invention may be used in multi-standard video tape recorders. In this document, the term television receiver should be construed as a receiver for receiving television signals. A video tape recorder is actually to be considered as such a receiver.

What is claimed is:

1. A receiver for receiving signals which are transmitted in accordance with different transmission standards (B/G-PAL, D/K-PAL), said receiver comprising:

a tuner (TUN) for selecting a desired signal to obtain an intermediate frequency signal (TIF);

an intermediate frequency filter circuit (IFF) for filtering the intermediate frequency signal (TIF) to obtain a filtered intermediate frequency signal; and a demodulator circuit (DEM) for deriving at least one pass band signal (VID, SND) from said filtered intermediate frequency signal, wherein the intermediate frequency filter circuit (IFF) comprises a main filter (FIL1), an auxiliary filter (FIL2), and a single-switch switching arrangement (SW) for selectively switching the auxiliary filter (FIL2) in parallel with the main filter (FIL1) as a function of the transmission standard (B/G-PAL, D/K-PAL) of the signal to be received for broadening the pass band of the intermediate frequency filter circuit.

2. A receiver as claimed in claim 1, characterized in that the main filter and the auxiliary filter have symmetrical inputs and/or symmetrical outputs which are commonly coupled in opposite phase.

3. A receiver as claimed in claim 1, characterized in that the main filter and the auxiliary filter have symmetrical inputs, one of the symmetrical inputs of each filter being coupled to signal ground.

4. A receiver as claimed in claim 1, characterized in that the switching arrangement attenuates the intermediate-frequency signal provided by the tuner.

5. A receiver as claimed in claim 4, characterized in that the switching arrangement comprises a series resistor for attenuating the intermediate-frequency signal.

6. A receiver as claimed in claim 1, characterized in that the switching arrangement comprises a switching transistor which is coupled between an input of the auxiliary filter and signal ground, and a switching diode which is coupled in series with the input of the auxiliary filter.

7. A method of receiving signals, in particular television signals, which are transmitted in accordance with different transmission standards, said method comprising the steps:

selecting a desired signal to obtain a switchable parallel intermediate-frequency signal;

intermediate-frequency filtering the intermediate-frequency signal to obtain a filtered intermediate-frequency signal; and deriving at least one baseband signal from said filtered intermediate-frequency signal;

characterized in that the intermediate-frequency filtering steps comprise the further steps:

subjecting said intermediate-frequency signal to a primary filtering operation to obtain a main filtered signal;

subjecting said intermediate-frequency signal (TIF) to an auxiliary filtering operation to obtain an auxiliary filtered signal in dependence upon a transmission standard of said desired signal; and obtaining said filtered intermediate-frequency signal from said main filtered signal and any auxiliary filtered signal.

* * * * *